(12) United States Patent
Choi

(10) Patent No.: US 11,642,954 B2
(45) Date of Patent: May 9, 2023

(54) VEHICLE INCLUDING FUEL CELL SYSTEM

(71) Applicants: Hyundai Motor Company, Seoul (KR); Kia Motors Corporation, Seoul (KR)

(72) Inventor: Do Sun Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 276 days.

(21) Appl. No.: 17/113,405

(22) Filed: Dec. 7, 2020

(65) Prior Publication Data

US 2022/0118843 A1 Apr. 21, 2022

(30) Foreign Application Priority Data

Oct. 15, 2020 (KR) .................. 10-2020-0133137

(51) Int. Cl.
| | |
|---|---|
| *B60K 6/32* | (2007.10) |
| *H01M 8/04082* | (2016.01) |
| *H01M 8/04223* | (2016.01) |
| *H01M 8/04089* | (2016.01) |
| *H01M 8/04119* | (2016.01) |
| *H01M 8/04828* | (2016.01) |
| *B60K 13/04* | (2006.01) |
| *B60K 15/03* | (2006.01) |
| *B60K 6/24* | (2007.10) |

(52) U.S. Cl.
CPC .............. *B60K 6/32* (2013.01); *B60K 6/24* (2013.01); *B60K 13/04* (2013.01); *B60K 15/03* (2013.01); *H01M 8/04097* (2013.01); *H01M 8/04141* (2013.01); *H01M 8/04201* (2013.01); *H01M 8/04231* (2013.01); *H01M 8/04835* (2013.01); *B60K 2015/03315* (2013.01); *B60Y 2200/92* (2013.01); *B60Y 2400/202* (2013.01); *H01M 2250/20* (2013.01)

(58) Field of Classification Search
CPC .......... B60K 6/32; B60K 13/04; B60K 15/03; H01M 8/04097; H01M 8/04141; H01M 8/04201; H01M 8/04231; H01M 8/04835; B60W 10/28; B60W 20/16

See application file for complete search history.

(56) References Cited

U.S. PATENT DOCUMENTS

| | | | |
|---|---|---|---|
| 10,830,125 B2* | 11/2020 | Pomar ................ | B60K 15/10 |
| 2005/0242588 A1* | 11/2005 | Washington ........ | H01M 16/006 |
| | | | 429/513 |
| 2006/0059892 A1* | 3/2006 | Hu ...................... | F01N 3/103 |
| | | | 60/275 |
| 2010/0040916 A1* | 2/2010 | Castaldi .............. | C12P 3/00 |
| | | | 423/658.2 |

(Continued)

*Primary Examiner* — Jeffrey J Restifo

(74) *Attorney, Agent, or Firm* — Morgan, Lewis & Bockius LLP

(57) ABSTRACT

A vehicle may include a fuel cell system configured for generating electrical energy used in the vehicle using hydrogen, an engine system including an engine and configured for generating power of the vehicle using hydrogen, an exhaust system that purifies exhaust gas discharged from the engine, and a hydrogen supply system connected to the fuel cell system, the engine system and the exhaust system, and configured for supplying the hydrogen used in the fuel cell system and the engine system, and ammonia (NH3) used in the exhaust system.

15 Claims, 2 Drawing Sheets

(56) References Cited

U.S. PATENT DOCUMENTS

| | | | | |
|---|---|---|---|---|
| 2010/0288249 | A1* | 11/2010 | Sasaki | F02B 43/00 |
| | | | | 123/575 |
| 2013/0288143 | A1* | 10/2013 | Lee | C25B 15/08 |
| | | | | 429/422 |
| 2014/0356738 | A1* | 12/2014 | Bell | C01B 3/047 |
| | | | | 429/411 |
| 2015/0275924 | A1* | 10/2015 | De Man | F04F 1/04 |
| | | | | 417/209 |
| 2017/0204767 | A1* | 7/2017 | Dougnier | C05G 5/37 |
| 2018/0009661 | A1* | 1/2018 | Kambara | C01B 3/047 |
| 2018/0151903 | A1* | 5/2018 | Matsusue | H01M 8/0662 |
| 2018/0226668 | A1* | 8/2018 | Van Schaftingen | C01C 1/086 |
| 2018/0274424 | A1* | 9/2018 | Monge-Bonini | H01M 8/1246 |
| 2021/0164407 | A1* | 6/2021 | Heggen | F02M 25/12 |
| 2021/0395082 | A1* | 12/2021 | Iwai | H01M 8/0606 |
| 2022/0093950 | A1* | 3/2022 | Goldstein | C25B 1/27 |
| 2022/0118843 | A1* | 4/2022 | Choi | B60W 10/06 |
| 2022/0223892 | A1* | 7/2022 | Takahashi | H01M 8/04089 |
| 2022/0259040 | A1* | 8/2022 | Kusakabe | B01J 21/18 |

* cited by examiner

VEHICLE INCLUDING FUEL CELL SYSTEM

CROSS-REFERENCE TO RELATED APPLICATION

The present application claims priority to Korean Patent Application No. 10-2020-0133137 filed on Oct. 15, 2020, the entire contents of which is incorporated herein for all purposes by this reference.

BACKGROUND OF THE INVENTION

Field of the Invention

The present invention relates to a vehicle including a fuel cell system. More particularly, the present invention relates to a hybrid vehicle including a fuel cell system using ammonia ($NH_3$) which is an SCR reducing agent for removing nitrogen oxides as a fuel.

Description of Related Art

As generally known, the fuel cell system is a type of power generation system that directly converts chemical energy possessed by fuel into electrical energy.

The fuel cell system includes a fuel cell stack for generating electrical energy, a fuel supply device for supplying fuel (hydrogen) to the fuel cell stack, an air supply device for supplying oxygen in air, which is an oxidizing agent required for electrochemical reaction, to the fuel cell stack, and a heat and water management device for removing reaction heat from the fuel cell stack to the outside of the system and controlling an operating temperature of the fuel cell stack.

With the present configuration, in the fuel cell system, electricity is generated by an electrochemical reaction between hydrogen as a fuel and oxygen in the air, and heat and water are discharged as reaction by-products.

Meanwhile, to reduce pollutants contained in exhaust gas such as carbon monoxide (CO), hydrocarbons (HC), particulate matter (PM), and nitrogen oxides (NOx), the exhaust system of the engine is provided with an exhaust gas post-treatment device such as a diesel oxidation catalyst (DOC) device, a particulate matter removal filter (Diesel Particulate matter Filter (DPF)), a selective catalyst reduction (SCR) device, and an ammonia oxidation catalyst (AOC) device.

In such an engine system with SCR and AOC systems, the use of ammonia reducing agents in larger amounts than before due to the next tightening of NOx emission regulations. However, since there is a concern about ammonia ($NH_3$) slip due to the limit of the catalyst storage capacity, the ammonia amount is predicted through the NOx sensor or the ammonia sensor at the rear of the AOC device to limit the ammonia injection amount. Accordingly, the maximum NOx purification rate cannot be obtained, and there is a problem of an increase in cost due to an increase in the amount of precious metals in the AOC device for removing ammonia slip.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a hybrid vehicle including a hydrogen fuel cell system using ammonia ($NH_3$) gas as a reducing agent for the SCR system, and using the ammonia gas as fuel for a hydrogen fuel cell system and a fuel for an internal combustion engine.

A vehicle according to various exemplary embodiments of the present invention includes a fuel cell system configured for generating electrical energy used in the vehicle using hydrogen, an engine system including an engine and configured for generating power of the vehicle using hydrogen, an exhaust system that purifies exhaust gas discharged from the engine, and a hydrogen supply system connected to the fuel cell system, the engine system and the exhaust system, and configured for supplying the hydrogen used in the fuel cell system and the engine system, and ammonia (NH3) used in the exhaust system.

The hydrogen supply system may include an $NH_3$ storage container of storing solid $NH_3$, an oil circulation circuit that communicates with an engine oil circuit and is provided in the $NH_3$ storage container to circulate a solvent that heats the solid $NH_3$, and a hydrogen generation catalyst device connected to the NH3 storage container and configured for generating high purity hydrogen from the solid $NH_3$ using a hydrogen separation catalyst.

The hydrogen supply system may further include a hydrogen buffer container for temporarily storing hydrogen generated from the hydrogen generation catalyst device and supplying hydrogen to the fuel cell system.

The $NH_3$ storage container may be controlled to be maintained at a temperature being equal to or higher than 80° C.

The fuel cell system may include a fuel cell stack generating the electrical energy by use of the hydrogen supplied from the hydrogen supply system, a hydrogen recycle blower connected to the fuel cell stack and recirculating unreacted high purity hydrogen remaining after being used at the anode of the fuel cell stack to the hydrogen supply system, a fuel cell system water trap connected to the fuel cell stack and collecting water generated from the fuel cell stack, and a humidifier that is connected to the fuel cell system water trap of the fuel cell stack and supplies an external air and the water collected by the fuel cell system water trap back to the fuel cell system.

The vehicle according to various exemplary embodiments of the present invention may further include a purge valve connected between the fuel cell stack and the humidifier and transferring low purity H2 remaining from the anode of the fuel cell stack to the humidifier.

The exhaust system may include a Diesel Oxidation Catalyst (DOC) device mounted on an exhaust pipe connected to the engine to discharge the exhaust gas of the engine and purifying hydrocarbon (HC) and carbon monoxide (CO) in exhaust gas, an injector connected to the $NH_3$ storage container and located at a rear end portion of the DOC device to supply $NH_3$ into the exhaust pipe, a Diesel Particulate matter Filter (DPF) of removing particulate matter, the DPF which is located at the rear end portion of the DOC device and is coated with a hydrolysis catalyst that hydrolyzes the NH3 supplied through the exhaust pipe through the injector to reduce particulate matter in exhaust gas, and a Selective Catalyst Reduction (SCR) device located at a rear end portion of the DPF and reducing nitrogen oxide (NOx)s of exhaust gas passing through the DPF.

The exhaust system may further include an Ammonia Oxidation Catalyst (AOC) device located at a rear end portion of the SCR device and oxidizing the NH3 in the exhaust gas passing through the SCR device and reducing nitrogen oxide (NOx)s.

The exhaust system may further include an exhaust system water trap connected to the AOC device and collecting water discharged from the AOC device and supplying the water to the humidifier.

The engine system may further include a fuel distributor temporarily storing hydrogen delivered from the hydrogen supply system and delivering the hydrogen to the fuel injector of the engine system.

According to various exemplary embodiments of the present invention, by supplying ammonia ($NH_3$) generated from the hydrogen supply system to the engine system and fuel cell system, and using it in the exhaust system as an SCR reducing agent for removing nitrogen oxides, the power generated from the fuel cell system may be efficiently used, and the efficiency of the SCR system may be increased.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
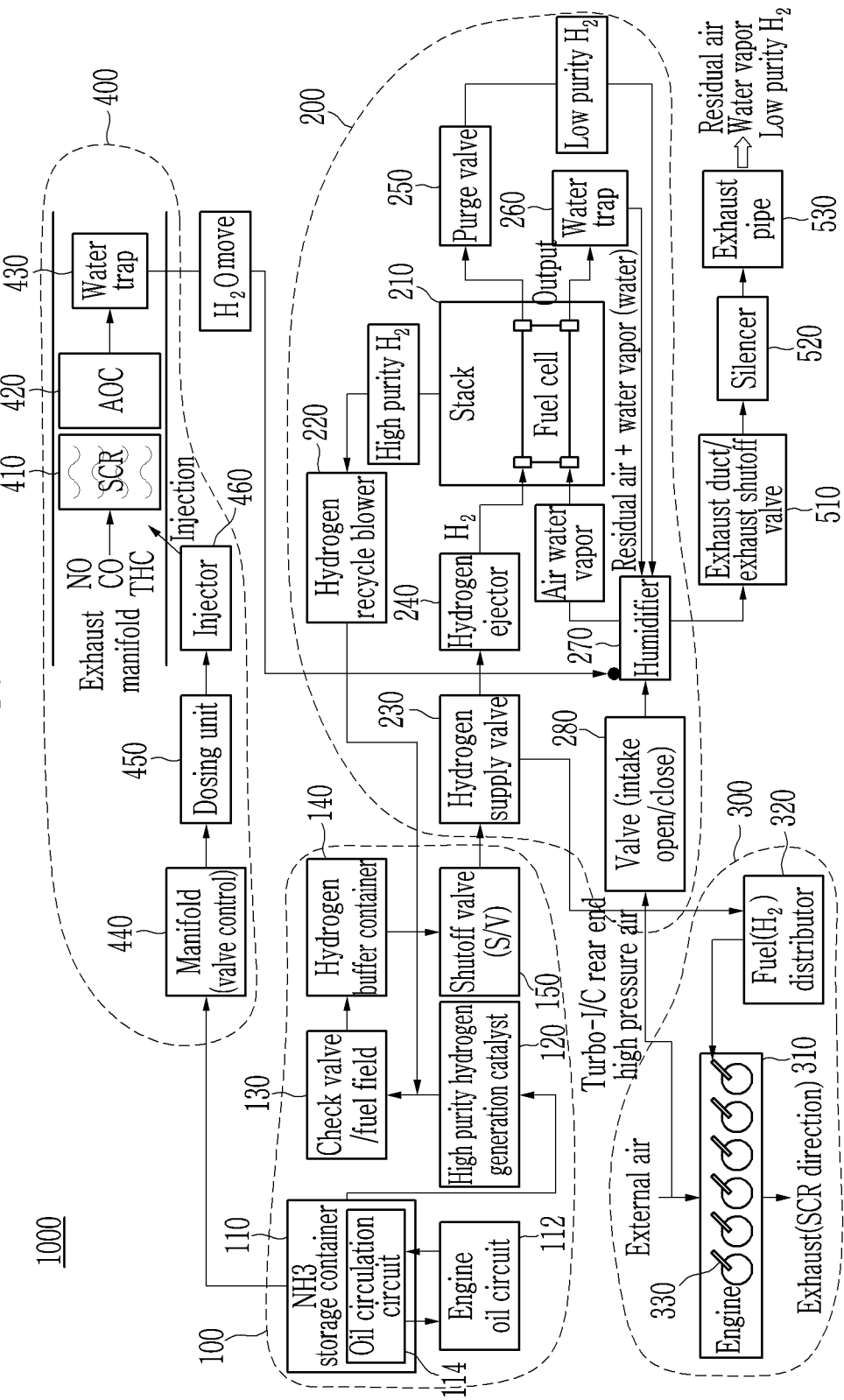
FIG. 1 is a block diagram schematically showing a hybrid vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Furthermore, in exemplary embodiments of the present invention, since like reference numerals designate like elements having the same configuration, a first exemplary embodiment of the present invention is representatively described, and in other exemplary embodiments of the present invention, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. It will be understood that when an element such as a layer, film, region, or substrate is referred to as being "on" another element, it may be directly on the other element or intervening elements may also be present.

The exemplary embodiment of the present invention shows various exemplary embodiments of the present invention in detail. As a result, various modifications of the drawings will be expected. As a result, various modifications of the drawings will be expected.

Now, a hybrid vehicle according to various exemplary embodiments of the present invention will be described with reference to FIG. 1 and FIG. 2.

FIG. 1 is a block diagram schematically showing a hybrid vehicle according to various exemplary embodiments of the present invention.

Referring to FIG. 1, the vehicle 1000 includes a fuel cell system 200, an engine system 300, an exhaust system 400, and a hydrogen supply system 100.

The fuel cell system 200 generates electrical energy used in a vehicle using hydrogen, the engine system 300 generates power of the vehicle using hydrogen, and the exhaust system 400 purifies exhaust gas emitted from the engine. Hydrogen is used for the fuel cell system 200 and the engine system 300, and ammonia ($NH_3$) is used for the exhaust system 400, and hydrogen and ammonia ($NH_3$) required for this are supplied from the hydrogen supply system 100.

First, the hydrogen supply system 100 includes an $NH_3$ storage container 110 for storing solid $NH_3$. An oil circulation circuit 114 for circulating a solvent (oil) for heating solid $NH_3$ is provided inside the $NH_3$ storage container 110. The oil circulation circuit 114 is in fluidical communication with the engine oil circuit 112 provided in the engine, and the oil flows through the engine oil circuit 112 and the oil circulation circuit 114 to heat the solid $NH_3$ to vaporize and liquefy the solid $NH_3$. To the present end, the $NH_3$ storage container 110 is maintained at a temperature of about 80° C. or higher.

$NH_3$ is vaporized to become high purity hydrogen ($H_2$) by the high purity hydrogen generation catalyst 120, which is used as fuel for the fuel cell system 200. Furthermore, the liquefied ammonia ($NH_3$) is configured as a reducing agent of the SCR catalyst of the exhaust system 400.

The high purity hydrogen generation catalyst device 120 of the hydrogen supply system 100 generates high purity hydrogen from solid $NH_3$ using a hydrogen separation catalyst. The generated high purity hydrogen is stored in the hydrogen buffer container 140 through the check valve 130 and is transferred to the hydrogen supply valve 230 by opening and closing the shutoff valve 150. High purity hydrogen is delivered to the fuel cell system 200 or the engine system 300 through the hydrogen supply valve 230.

In the engine system 300, the engine 310 combusts fuel to generate torque. That is, the engine 310 converts chemical energy into mechanical energy by combusting fuel and air.

The engine 310 includes a plurality of combustion chambers, an ignition device, and an injector. Fuel and air are introduced into the combustion chamber, the ignition device ignites the fuel and air introduced into the combustion chamber, and the injector injects fuel into the combustion chamber.

As the engine 310, various known engines such as a gasoline engine, a diesel engine, and a liquefied petroleum injection (LPI) engine may be used.

The engine system 300 may further include a fuel distributor 320 that temporarily stores hydrogen delivered from the hydrogen supply system 100 and delivers it to the fuel injector 330 of the engine system 300. Hydrogen delivered from the hydrogen supply system 100 may be used as hydrogen fuel for the engine system 300. The engine 310 is an internal combustion engine that utilizes hydrogen as a fuel and generates power by use of an explosion phenomenon of hydrogen fuel.

Meanwhile, ammonia (urea) liquefied from the $NH_3$ storage container 110 is delivered to the exhaust system 400. Ammonia is supplied from the $NH_3$ storage container 110 to the catalyst of the exhaust system 400 through a manifold 440 controlling a valve, a dosing unit 450, and an injector 460.

The exhaust system 400 may include a selective catalyst reduction (SCR) device 410 for reducing nitrogen oxides in exhaust gas. Furthermore, the exhaust system 400 may further include an ammonia oxidation catalyst (AOC) device that oxidizes ammonia ($NH_3$) in the exhaust gas passing through the SCR device 410 and reduces nitrogen oxides at the rear end portion of the SCR device 410.

The SCR device 410 is configured to convert $NH_3$ to ammonia by heat of exhaust gas, and to reduce nitrogen oxides to nitrogen gas and water as a catalytic reaction of nitrogen oxides and ammonia in exhaust gas by a selective reduction catalyst.

The AOC device 420 is configured to prevent ammonia from being directly released into the atmosphere. This is to prevent air pollution due to ammonia slip phenomenon, which is discharged directly into the atmosphere when the reducing agent is excessively injected to secure high selective reduction catalyst efficiency.

On the other hand, although not shown in the drawings, the exhaust system 400 may further include a Diesel Oxidation Catalyst (DOC) device configured for purifying hydrocarbon (HC) and carbon monoxide (CO) in exhaust gas, and a Diesel Particulate matter Filter (DPF) that reduces particulate matter in exhaust gas by coating a hydrolysis catalyst that hydrolyzes ammonia.

The exhaust system 400 may further include an exhaust system water trap 430 collecting water ($H_2O$) discharged from the ammonia oxidation catalyst device and supplying the water to the humidifier. Water discharged during exhaust by the exhaust system 400 is collected in an exhaust system water trap 430, which is delivered to the humidifier 270 of the fuel cell system 200. Accordingly, sufficient water supply to the fuel cell system 200 is ensured. In the fuel cell system 200, the humidity may be maintained at about 80% to facilitate the ionization of $H_2$, and high humidity may be ensured by water supplied from the exhaust system 400.

Meanwhile, the fuel cell system 200 includes a fuel cell stack 210, a hydrogen recycle blower 220, a fuel cell system water trap 260, and a humidifier 270. The fuel cell stack 210 generates electrical energy by use of the hydrogen supplied from the hydrogen supply system 100.

Although not shown, the fuel cell system 200 may include a (high voltage) battery connected to the fuel cell system, and a motor-generator configured for generating power or generating power by being electrically connected to the battery, and may apply power to the hybrid vehicle according to various exemplary embodiments of the present invention by driving an engine/motor.

Figure 2:
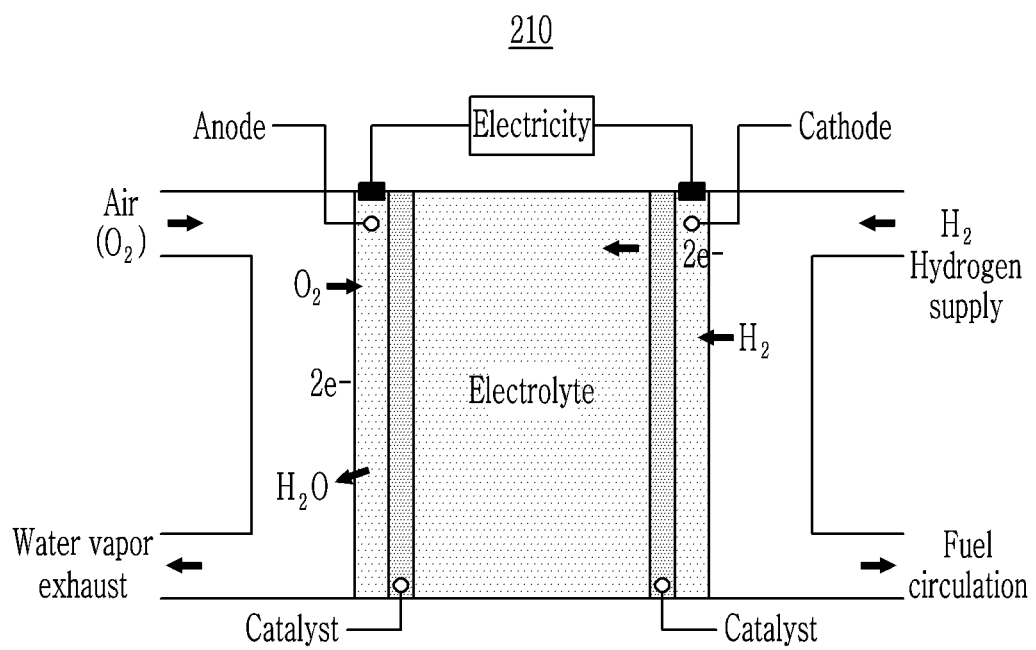
FIG. 2 is a diagram illustrating a principle of separating $H_2$ from a fuel cell stack in a fuel cell system of a hybrid vehicle according to various exemplary embodiments of the present invention.

FIG. 2 is a diagram illustrating a principle of separating $H_2$ from a fuel cell stack in a fuel cell system of a hybrid vehicle according to various exemplary embodiments of the present invention.

Referring to FIG. 2, when hydrogen is supplied to the anode of the fuel cell stack 210, hydrogen transferred to the anode through the electrode film combines with oxygen transferred from the anode to form $H_2O$ molecules, and the hydrogen transferred at the excessive pressure is discharged from the anode, including $H_2O$, along with oxygen. Since hydrogen at the present time needs to be separated again, it is called low purity Hydrogen. Residual hydrogen remaining without passing through the electrode film after hydrogen is supplied from the cathode of the fuel cell stack 210 is referred to as high purity hydrogen, which is recycled and supplied again to the negative electrode of the fuel cell stack 210.

The low purity hydrogen delivered to the anode of the fuel cell stack 210 is delivered to the humidifier 270 through the purge valve 250, and the $H_2O$ is delivered to the fuel cell system water trap 260 and then to the humidifier 270. The low purity hydrogen and $H_2O$ delivered to the humidifier 270 are resupplied together with air to the negative electrode of the fuel cell stack 210.

The remaining unreacted high purity hydrogen remaining in the negative electrode of the fuel cell stack 210 is delivered to the hydrogen recycle blower 220 and delivered to the hydrogen buffer container 140 of the hydrogen supply system 100, and again by the hydrogen ejector 240. It is resupplied to the negative electrode of the fuel cell stack 210.

Meanwhile, excess air, water vapor, and low purity hydrogen delivered to the humidifier 270 are discharged to the outside through an exhaust duct 510, a silencer 520, and an exhaust pipe 530.

Like this, according to various exemplary embodiments of the present invention, by supplying ammonia ($NH_3$) generated from the hydrogen supply system to the engine system and fuel cell system, and using it in the exhaust system as an SCR reducing agent for removing nitrogen oxides, the power generated from the fuel cell system may be efficiently used, and the efficiency of the SCR system may be increased.

In an exemplary embodiment of the present invention, a controller is connected to at least one of the elements of the fuel cell system 200, the engine system 300, the exhaust system 400, and the hydrogen supply system 100, to control the operations thereof.

In addition, the term related to a control device such as "controller", "control unit", "control device" or "control module", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a controller, and the controller may be configured by multiple controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   a fuel cell system configured for generating electrical energy used in the vehicle by using hydrogen;
   an engine system including an engine and configured for generating power of the vehicle by using the hydrogen;
   an exhaust system that is connected to the engine system and purifies exhaust gas discharged from the engine; and
   a hydrogen supply system connected to the fuel cell system, the engine system and the exhaust system, and configured for supplying the hydrogen used in the fuel cell system and the engine system, and ammonia (NH3) used in the exhaust system,
   wherein the hydrogen supply system includes:
      an $NH_3$ storage container of storing solid $NH_3$;
      an oil circulation circuit that fluidically-communicates with an engine oil circuit and is provided in the $NH_3$ storage container to circulate a solvent that heats the solid $NH_3$; and
      a hydrogen generation catalyst device connected to the $NH_3$ storage container and configured for generating high purity hydrogen from the solid $NH_3$ using a hydrogen separation catalyst.

2. The vehicle of claim 1, wherein the hydrogen supply system further includes a hydrogen buffer container connected to the hydrogen generation catalyst device and configured for storing, for a predetermined time, the hydrogen generated from the hydrogen generation catalyst device and for supplying the hydrogen to the fuel cell system.

3. The vehicle of claim 2, wherein the fuel cell system includes a hydrogen supply valve connected to a fuel cell stack of the fuel cell system, the hydrogen buffer container of the hydrogen supply system and the engine of the engine system, to selectively supply the hydrogen from the hydrogen buffer container of the hydrogen supply system to at least one of the fuel cell stack of the fuel cell system and the engine of the engine system.

4. The vehicle of claim 1, wherein the $NH_3$ storage container is controlled to be maintained at a temperature being equal to or higher than 80° C.

5. The vehicle of claim 1, wherein the fuel cell system includes:
   a fuel cell stack generating the electrical energy by use of the hydrogen supplied from the hydrogen supply system;
   a hydrogen recycle blower connected to the fuel cell stack and recirculating unreacted high purity hydrogen remaining after being used at an anode of the fuel cell stack, to the hydrogen supply system;
   a fuel cell system water trap connected to the fuel cell stack and collecting water generated from the fuel cell stack; and
   a humidifier that is connected to the fuel cell system water trap of the fuel cell stack and supplies an external air and the water collected by the fuel cell system water trap back to the fuel cell system.

6. The vehicle of claim 5, further including a purge valve connected between the fuel cell stack and the humidifier and transferring low purity H2 remaining from the anode of the fuel cell stack to the humidifier.

7. The vehicle of claim 1, wherein the exhaust system includes:
   a Diesel Oxidation Catalyst (DOC) device mounted on an exhaust pipe connected to the engine to discharge the exhaust gas of the engine and purifying hydrocarbon (HC) and carbon monoxide (CO) in the exhaust gas;
   an injector connected to the $NH_3$ storage container and located at a rear end portion of the DOC device to supply the NH3 into the exhaust pipe;
   a Diesel Particulate matter Filter (DPF) of removing particulate matter, the DPF which is located at the rear end portion of the DOC device and is coated with a hydrolysis catalyst that hydrolyzes the NH3 supplied through the exhaust pipe through the injector to reduce the particulate matter in the exhaust gas; and
   a Selective Catalyst Reduction (SCR) device located at a rear end portion of the DPF and reducing nitrogen oxides of the exhaust gas passing through the DPF.

8. The vehicle of claim 7, wherein the exhaust system further includes an Ammonia Oxidation Catalyst (AOC)

device located at a rear end portion of the SCR device and oxidizing the NH3 in the exhaust gas passing through the SCR device and reducing the nitrogen oxides.

9. The vehicle of claim 8, wherein the exhaust system further includes an exhaust system water trap connected to the AOC device and collecting water discharged from the AOC device and supplying the water to a humidifier connected to a fuel cell stack of the fuel cell system.

10. The vehicle of claim 1, wherein the exhaust system includes:
   an injector connected to the $NH_3$ storage container to supply the NH3 into an exhaust pipe connected to the engine; and
   a Selective Catalyst Reduction (SCR) device mounted on the exhaust pipe and reducing nitrogen oxides of the exhaust gas passing therethrough.

11. The vehicle of claim 10, wherein the exhaust system further includes an Ammonia Oxidation Catalyst (AOC) device located at a rear end portion of the SCR device and oxidizing the NH3 in the exhaust gas passing through the SCR device and reducing the nitrogen oxides.

12. The vehicle of claim 11, wherein the exhaust system further includes an exhaust system water trap connected to the AOC device and collecting water discharged from the AOC device and supplying the water to a humidifier connected to a fuel cell stack of the fuel cell system.

13. The vehicle of claim 1, wherein the engine system further includes a fuel distributor connected to the hydrogen supply system and configured for storing, for a predetermined time, the hydrogen delivered from the hydrogen supply system and delivering the hydrogen to a fuel injector of the engine system.

14. The vehicle of claim 13, wherein the fuel cell system includes a hydrogen supply valve connected to a fuel cell stack of the fuel cell system, the hydrogen supply system and the fuel distributer of the engine system, to selectively supply the hydrogen from the hydrogen supply system to at least one of the fuel cell stack and the fuel distributor of the engine system.

15. The vehicle of claim 1, wherein the fuel cell system includes a hydrogen supply valve connected to a fuel cell stack of the fuel cell system, the hydrogen supply system and the engine of the engine system, to selectively supply the hydrogen from the hydrogen supply system to at least one of the fuel cell stack in the fuel cell system and the engine of the engine system.

\* \* \* \* \*